United States Patent [19]

Malsot et al.

[11] 4,339,165
[45] Jul. 13, 1982

[54] CONNECTOR PROTECTIVE DEVICE AND CONNECTOR PROVIDED WITH SUCH A PROTECTIVE DEVICE

[75] Inventors: Christian Malsot; Michel Guerrero, both of Suresnes, France

[73] Assignee: Socapex, Suresnes, France

[21] Appl. No.: 160,845

[22] Filed: Jun. 19, 1980

[30] Foreign Application Priority Data

Jun. 20, 1979 [FR] France ............................ 79 15803

[51] Int. Cl.³ ............................................. H01R 13/44
[52] U.S. Cl. ............................................................ 339/41
[58] Field of Search ........................ 339/40, 41, 29 R

[56] References Cited

U.S. PATENT DOCUMENTS 3,525,068 8/1970 Nelson .................................... 339/41
4,203,640 5/1980 Bice et al. .............................. 339/41

FOREIGN PATENT DOCUMENTS 439841 12/1935 United Kingdom ................. 339/41
464250 4/1937 United Kingdom ................. 339/41

*Primary Examiner*—Joseph H. McGlynn
*Assistant Examiner*—Frank H. McKenzie, Jr.
*Attorney, Agent, or Firm*—Cushman, Darby & Cushman

[57] ABSTRACT

A device for protecting contact elements of a connector having two ends, made up of an inner and outer disk mounted to support cylinders placed in front of the contact face of each end, and pierced with openings. The openings on the outer disk are normally masked by the inner disk, and are open to the contact elements only at the time of connection, under the action of a circumferentially disposed control ring, carrying a lug working with grooves on the support cylinders. The applications of the invention are particularly in the fields of television cameras and oil prospecting.

13 Claims, 4 Drawing Figures

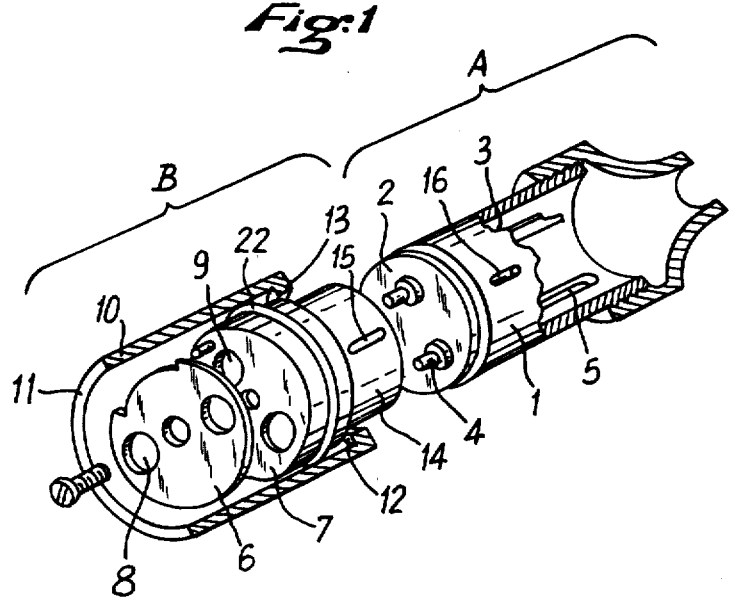
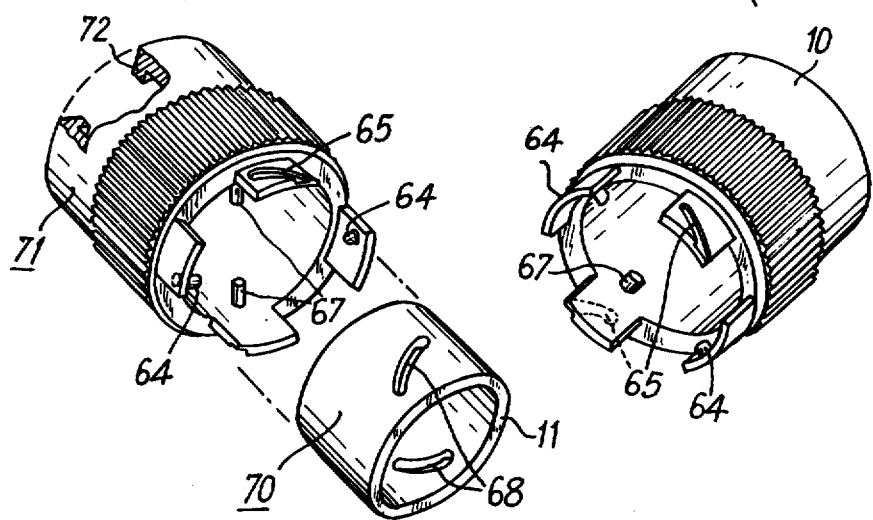

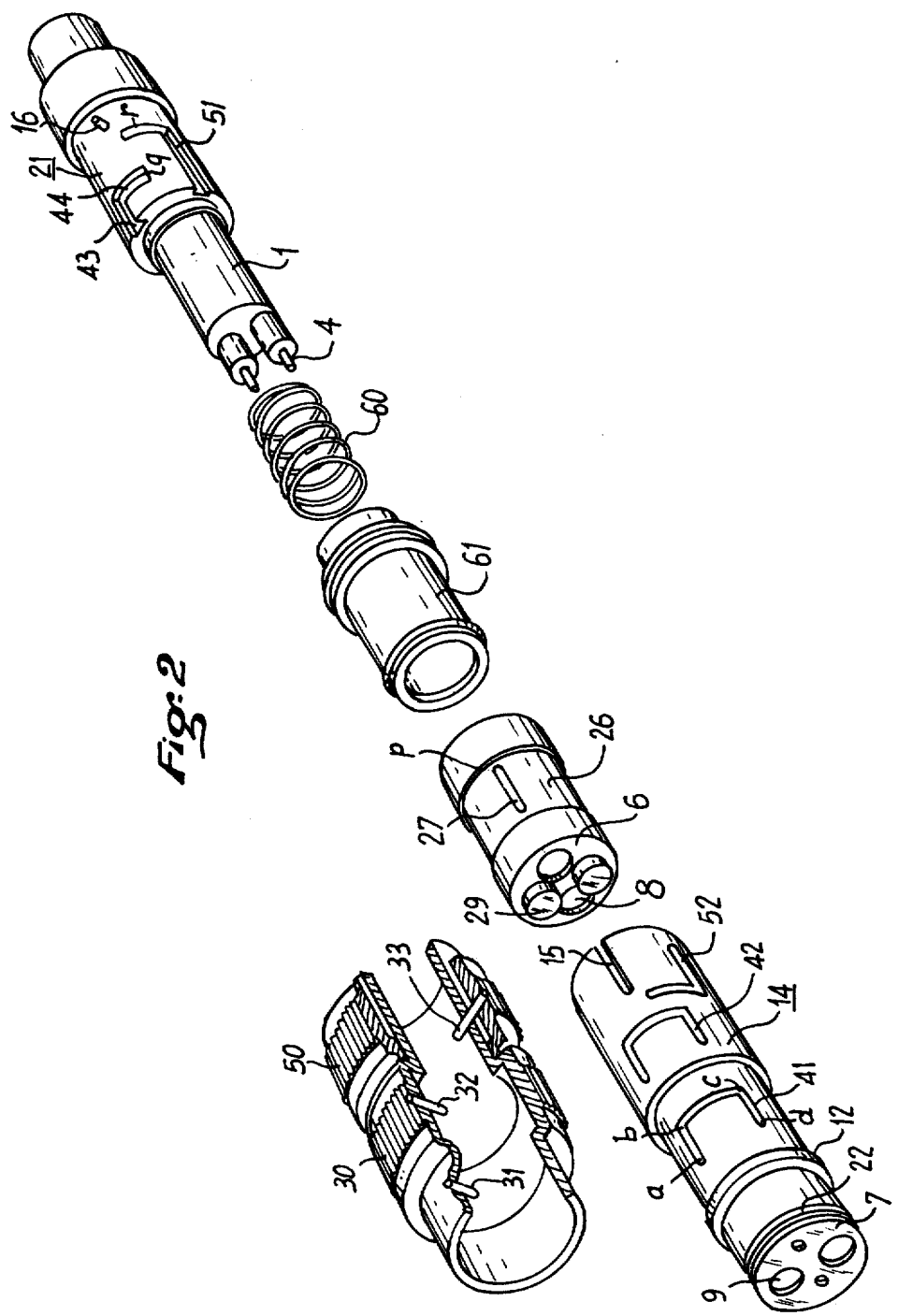

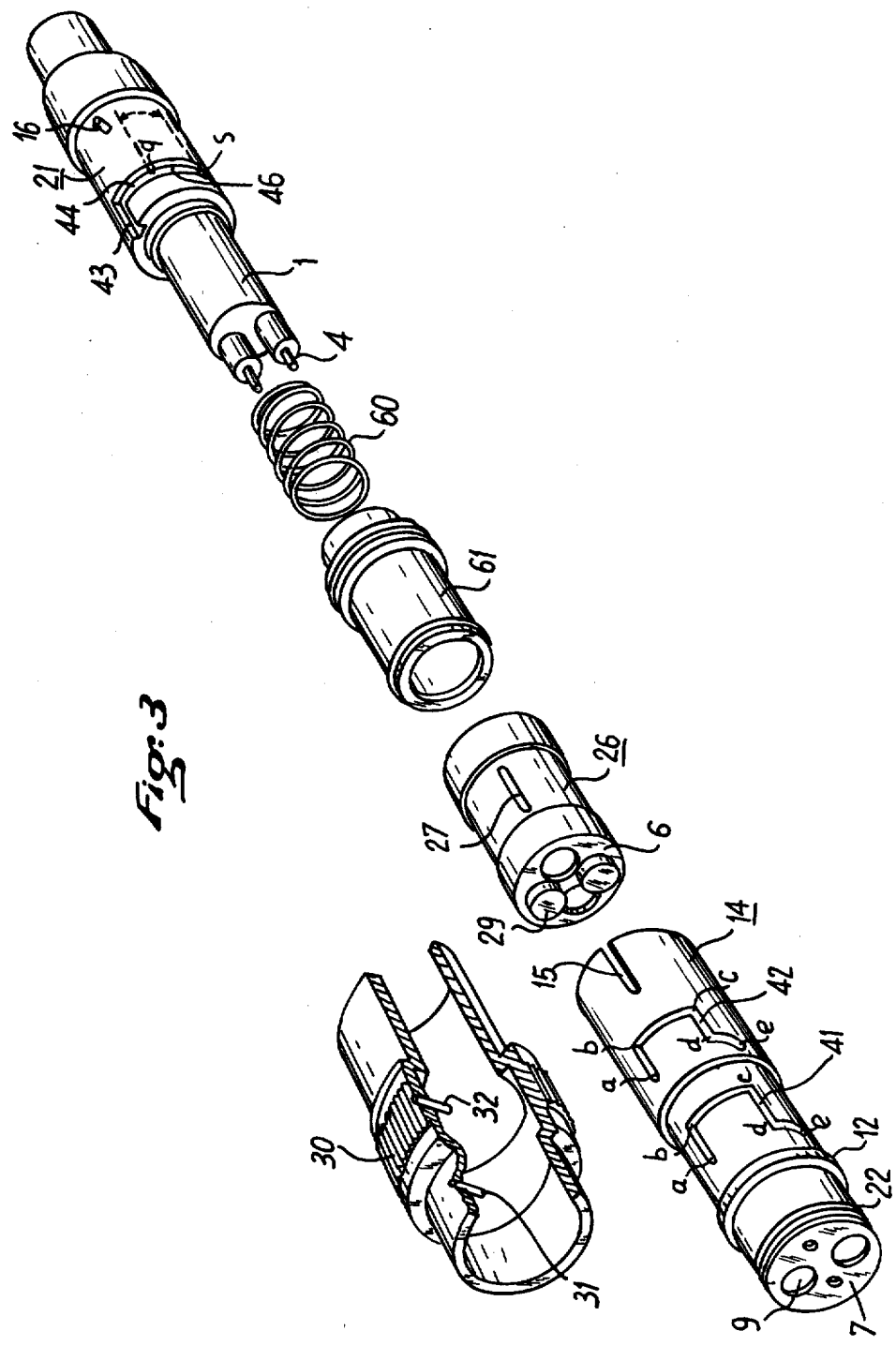

CONNECTOR PROTECTIVE DEVICE AND CONNECTOR PROVIDED WITH SUCH A PROTECTIVE DEVICE

This invention relates to the technical field of conductors, and more particularly concerns those intended to be used in an adverse environment, comprising the presence of water, mud or corrosive atmospheres, for example.

Transmission with only slight losses in magnitude of an electric or optical energy, for example, is impaired in such an environment as a result of impurities or alterations that it causes on the active surfaces of the connector assuring the transmission.

For this reason, it has been proposed to provide the two parts or ends constituting the connector, with devices for protecting the faces which are put together to make the connection, in the form of moving seals which, normally closed when the ends are separated, are open only during plug-in.

However, known embodiments suffer from various drawbacks, of which the most serious are, on the one hand, an increase of the size of the connector thus equipped when protective seals and housings provided to receive them project beyond their outside contour and, on the other hand, for similar reasons, their fragility.

One of the purposes of this invention is to propose a connector not having these drawbacks, the protective device being housed inside the end, and therefore protected and compact.

Another drawback applies to known connectors which terminate a great length of cable used in an adverse environment.

This is the case, for example, in the field of television for connecting cameras; this is also the case of prospecting for oil deposits where a great number of such cables of unit length on the order of a hundred or so meters are placed on dirty or wet grounds.

In these uses, an error on the male or female type of the ends of the terminal connector makes it necessary to reverse the cable ends which results in considerable movement over the ground, hence unacceptable losses of time and labor.

Another purpose of the invention is to propose a connector for adverse environments not requiring such changes. This type of connector includes a pair of identical ends, which hereinafter for simplification will be designated by the term hermaphrodite.

Basically, the invention uses two groups of protective means, one aiming at protecting the active face of each unconnected end, the other at protecting the connector after assembly of the two ends and connecting of the cables.

The groups of means use two concentric disks, pierced with openings and placed parallel to the front contact face of each end. When an end is disconnected, the two disks are mutually directed so that each respective opening of one is placed opposite the solid part of the other, assuring the protection of the contact face; at the time of plugging together, one of the disks is rotated in relation to the other so that their respective openings are opposite, this uncovering the contact face and active elements necessary for transmission.

The connecting operations therefore comprise a certain number of steps that have to be done in a predetermined order, namely, (1) rotation of the sealing disk to uncover the opening of the stationary disk of the front contact face, (2) forward translation of the end to project its conductive elements through the openings and (3) locking of the end in the forward position. Disconnecting operations comprise the opposite steps, namely, (1) unlocking of the end, (2) backward translation of the end to free the openings, and (3) rotation of the seal disk to close the openings of the front face.

Yet another purpose of this invention is to propose a control system of the protective device by performing the succession of steps listed above with a single means, allowing the user to perform these steps easily, without error and in an adverse environment.

The second group of means consists of a moving casing, which then comes, by translation, to cover the lateral surfaces of the set of two ends, assuring the protection of the contour of their common junction.

The contact surfaces of the disks and that of the casing carry housings in the shape of grooves to receive elastic rings assuring fluid tightness between the corresponding stationary and moving elements of the connector. More precisely, the invention consists of a connector protective device made up of two ends. Each end comprises an insulating unit exhibiting a front contact face and a plurality of contact elements projecting on this face. The protective device comprises two disks placed parallel to the contact face, provided with openings in the same arrangement as the contact elements. The disks are capable of a movement of rotation in relation to one another, uncovering these elements and; of a movement of translation perpendicular to the contact face, placing these projecting elements through the openings. Control means which assure the succession of the steps of rotation and translation in a preestablished order is also provided.

The invention will be better understood from the following description, with reference to the accompanying drawings in which:

FIG. 1 represents in perspective, a partial view of a connector and a protective device according to the invention;

FIG. 2 represents, in perspective, in an exploded view, an embodiment of the protective device according to the invention;

FIG. 3 represents another embodiment comprising automatic locking;

FIG. 4 represents a lateral protective sleeve according to the invention.

FIG. 1 represents in perspective, a diagrammatic view in partial section of a connector and protective device according to the invention.

The connector, referenced as A, comprises an insulating body or unit 1 exhibiting a wall with two faces, namely, a front face 2 on which contact elements such as 4 come out and a back face from which the connecting ends 5 of the contact elements project.

The protective device, placed in front of the front face 2 of the connector is represented as B. It comprises two disks 6 and 7, one of which can have a relative movement of rotation in relation to the other, around an axis. Each carries openings such as 8 and 9 of such size and arrangement that they can allow the contact elements to pass.

Further, the two disks can have a movement of translation perpendicular to their plane.

Finally, a cylindrical sleeve 10, placed coaxially with the two disks can occupy, by translation along its axis, two positions, one where its base surface 11 is aligned with the disks, the other where it covers the latter, this translation being limited by rims 12 and 13 cooperating to form a stop.

For use of the protective device it is preferable that one of the disks be secured to exhibit its openings in the same direction as the connector contact elements, the other disk acting as a rotary seal. For this, one of the disks is provided with an orientation sleeve 14 provided with a groove 15 working with a lug 16 carried by end 1 of the connector.

It should be noted that seal disk 6 is, in the embodiment of FIG. 1, placed on the outside of second disk 7, which permits easy rotation control.

It is also possible, as a variant, to place it on the inside of second disk 7, which results in a less easy rotation control but protects it from causes of degradation and external impacts.

The protective device of FIG. 1 functions as follows:

When the connector end is in the unconnected state, sleeve 10 is in the back position and its base surface 11 is aligned with the disks; seal disk 6 is directed, in relation to stationary disk 7, so that its openings 8 are opposite the solid parts of the latter. The conductor end is thus protected from the adverse environment.

During connecting, the seal disk 6 turns at a given angle to make its openings 8 coincide with those openings 9 of stationary disk 7; end 1 then advances and its contact elements 4 project toward the outide of the protective disk.

Connection is then possible with the complementary end, not shown, of the connector. Finally, protective sleeve 10 is pushed in the direction of this complementary end which it partially covers, protecting the front contact faces from impurities when the connection has been made.

For disconnection, the operations go through a series of steps in the opposite order. It should be noted that any failure to follow the steps of the two types of operations—connection and disconnection—impairs the functioning of the protective device and the connector itself. The role of the control device according to the invention is to prevent any error.

FIG. 2 represents, in an exploded perspective, an embodiment of the protective device according to the invention.

This embodiment corresponds to the case where seal disk 6 is placed behind stationary orientation disk 7, as explained at the end of the description of FIG. 1.

The connector end is represented as 1, and the protective device, whose elements are found in FIG. 1, is made up of (1) a support unit 21 for end 1, of (2) outside disk 7 carried by its sleeve 14, whose stationary orientation in relation to the end is assured by groove 15 working with lug 16, and of (3) inside seal disk 6, carried by its sleeve 26, whose rotation is assured by groove 27, working with a lug of the control system which will now be described.

Basically, the control system resorts to an outside maneuvering ring 30, placed concentric with the end and whose action on the sleeves of disks 6 and 7 is performed by lugs such as 31 and 32, working with grooves such as 41, 42 and 47 carried by the elements of the protective device. The movements of the maneuvering ring are directed by guide grooves such as 41 and 42 carried by sleeve 14 of outside disk 7, thus assuring the succession, in a determined order, of the operating steps, by preventing any error in this order.

A second ring 50, carried by maneuvering ring 30, assures, at the end of the connecting step, the locking, in the forward position, of end 1 and its support unit 21, by the action of its lug 33 in the circular part of locking groove 51.

Finally, a spring 60, contained in a protective sleeve 61, assures take-up of mechanical play that can exist between the various lugs and grooves of the control system.

Functioning of the protective device properly so-called is the same as that of the device diagrammed in FIG. 1.

Starting from the situation where end 1 is disconnected, the support unit is in the back position, under the action of lug 32 working with circular part 44 of the groove of the support unit. Seal 6 is closed, under the action of lug 31, working with groove 27. It should be noted that cylinders or studs such as 29 can be fastened on seal disk 6 to seal openings 9 by exhibiting an absolutely plane front face 7, and therefore easy to clean in case it is dirtied when the end is in the unconnected state and therefore particularly vulnerable to dust.

For the connecting operation, the control ring will describe movements directed by guide grooves 41 and 42.

A first backward movement, corresponding to portion a b of the groove 41, makes seal sleeve 26 recoil by the action of lug 31 on portion p of its groove. The other lugs exert no action, because they are placed in portions of their associated grooves that are parallel to the axial movement of the control ring.

In a second movement, the ring rotates, directed by portion b c of the guide groove; the seal disk then rotates, putting its openings 8 opposite those of front disk 9.

In a third movement, the control ring makes a forward translation permitted by portion c d of the guide groove. Seal disk 6 remains stationary, lug 31 which controls it moving freely in its groove 27. In the other hand, end 1 and its support unit 21 move forward, and contact elements such as 4 project in relation to front disk 7, because lug 32 which controls it rests on end q of the control groove, which is circular in this portion.

Spring 60 is then in its compressed state, in its protective sleeve 61 and it is necessary to lock the end and its support unit in their forward position. This is the role of lock ring 50, provided with a locking lug 33, moving in control groove 51 carried by the unit, and locking groove 52 carried by outside sleeve 14.

By rotation of ring 50, lug 33 rests on portion r of the locking groove, which ends the group of connecting operations, the other corresponding end, not shown, of the connector having undergone the same group of steps.

FIG. 3 represents another embodiment of the protective device of the invention, which is particularly advantageous because of the elimination of the locking ring of FIG. 2.

In this case, for this function, lug 32 and its guide groove 42, already put in place for forward translation of end 1 and its unit 21, are resorted to.

According to this embodiment, guide groove 42 is provided with a circular additional portion d, e, on which lug 32 can rest, simultaneously with resting on a circular additional portion q, s carried by end support unit 21.

It is then particularly simple to reach the final locking stage, since it is limited, after the stage of putting the end in the advanced position, to additional rotation of the control ring, by making lug 32 travel the remaining part d, e of the guide groove.

FIG. 4 represents an advantageous embodiment of protective ring 10 of FIG. 1.

After the connection properly so-called, it is necessary to protect the contact side region from dirt, and according to the invention, the function is combined with that of the coupling function of the two ends.

For this, protective ring 10 of FIG. 1 is split into two parts: a front part 70, assuring the protective function properly so-called, working with an elastic joint 22 carried by a stationary outside sleeve 14 represented in FIGS. 2 or 3, assuring fluid protection from dirt.

This front part 70 is fastened on a back part 71 of the protective ring by lugs such as 67 working with helicoidal grooves 68, a part provided with a support rim 72, resting on a rim 12 carried by stationary outside sleeve 14 of FIGS. 2 or 3.

Functioning of the protective ring is as follows: the two ends of the connector each carrying such a ring, one of them—at the user's choice—is put in the advanced position by rotation of its front part 70 in relation to its back part 71, lugs such as 67 moving in helicoidal grooves such as 68. The two ends are then placed opposite one another, and the connection can take place, the two ends being made solid by any known means.

However, according to the invention, it has been found particularly advantageous to make the protective ring assume a second function, that of assembly of the two ends.

For this, back part 71 of the ring carries coupling means on its front face. These means can be complementary threadings, but according to a particularly advantageous embodiment, the invention proposes, for these means, a plurality of lugs 64 and grooves 65 arranged in regularly interrupted sectors, and working together like multiple-pitch screw threads.

The two functions are then assumed by the same means, thus simplifying the structure of the protective device against adverse environmental conditions, and the hermaphrodite type of coupling ring further avoids the drawbacks indicated above of errors about male and female ends of long cables.

It should be further noted that use of the protective ring, which was described in the above as constituting the final step of assembly of the two ends, can, without going outside the scope of the invention, also constitute the initial step, the connecting operations properly so-called being performed under the shelter of the protective sleeve; these operations then being done without the possibility of visual control.

Finally, it should be noted that, in all the above, the structure of the device of the invention does not depend on the type of connection and the physical magnitude that this connector is to transmit. Thus, although the connecting of electric conductors constitutes an important use of connectors provided with the protective device of the invention, optic fiber connection is also within the scope of the invention.

We claim:

1. A connector protective device for protecting an end of a connector having two disconnected ends, each end including an insulating unit exhibiting a front contact face having a longitudinal axis perpendicular thereto, and a plurality of spacially arranged contact elements projecting from said face, said device comprising for each said end:

two disks including an outside disk and an inside disk respectively centered on said longitudinal axis, disposed parallel to the contact face, and having openings of the same spacial arrangement as the contact elements, and capable, on the one hand, of rotational movement in relation to one another about said longitudinal axis between a first angular position in which said contacts are uncovered by said two disks aligned with said openings, and a second angular position in which said contacts are covered by said two disks aligned with said openings, and on the other hand, of translational movement along said axis perpendicular to the contact face, placing the projecting elements in a position through said openings when said disks are in said first angular position, said device further comprising control means, limiting said rotational movement and said translational movement to a preestablished order.

2. Device according to claim 1, further comprising an elastic element for exerting a force upon said two disks opposing said translational movement.

3. Device according to claim 1, further comprising means for locking the contact elements in said position projecting through said openings.

4. Device according to claim 1, wherein said control means includes support cylinders for each of said two disks, assembled coaxially, having guide grooves, and a control organ having lugs extending into said grooves for cooperating therewith for said rotational and translational movements.

5. Device according to claim 1, further comprising support cylinders for said two disks, assembled coaxially, said end carrying a lug, said support cylinder having a guide groove receiving said lug for aligning said outside disk so that its openings are fixed opposite said contact elements.

6. Device according to claim 3, wherein said control means comprises a control ring, said control ring carrying said locking means, said locking means consisting of a locking ring mounted axially on said control ring and provided with a lug, said control means further comprising a support cylinder for supporting said outside disk, said support cylinder and said end respectively having grooves, said grooves receiving said lug for rotationally locking said contact elements.

7. Device according to claim 3, wherein said control means comprises a support cylinder for supporting said outside disk and a control ring, said support cylinder and said end each having grooves formed therein, said locking means comprising a lug carried by said control ring, said lug working with said grooves respectively carried by said support cylinder and said end to rotationally lock said contact elements in said position projecting through said openings.

8. Device according to claim 2, further comprising a guide cylinder, said elastic element including a coil spring housed in said guide cylinder, said coil spring and said guide cylinder both being mounted coaxially with said end.

9. Device according to claim 4, wherein said control organ comprises a control ring mounted coaxially with said disks, said control ring bearing said lugs, said inside disks including parts in relief disposed between said openings, said parts sealing closed said openings of said outside disks by a relative translational movement of said support cylinders of said two disks, assured by one of said lugs of said control ring working with one of said grooves of said support cylinders.

10. Device according to claim 4, further comprising a protective sleeve, mounted coaxially with the support cylinder of said outside disk, capable of a translational movement placing said protective sleeve in projection in relation to said outside disk.

11. A connector having two disconnected ends, wherein said ends are both provided with a protective sleeve according to any of claims 1-10.

12. Connector, according to claim 11, wherein said protective device includes a coaxial protective sleeve, said sleeve including an assembly ring having means for connecting said two ends.

13. Connector, according to claim 12, wherein said assembly ring is of the hermaphrodite type.

* * * * *